US011740109B2

(12) United States Patent  (10) Patent No.: US 11,740,109 B2
Boelke et al.  (45) Date of Patent: Aug. 29, 2023

(54) DIGITAL AIR DATA SYSTEMS AND METHODS

(71) Applicant: Rosemount Aerospace Inc., Burnsville, MN (US)

(72) Inventors: Joel Boelke, Eden Prairie, MN (US); Brian Brent Naslund, Chanhassen, MN (US); Benjamin John Langemo, Shakopee, MN (US); Michael Robert Daup, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 1007 days.

(21) Appl. No.: 16/363,870

(22) Filed: Mar. 25, 2019

(65) Prior Publication Data

US 2020/0309573 A1  Oct. 1, 2020

(51) Int. Cl.
*G01D 7/00* (2006.01)
*B64D 43/00* (2006.01)
*H04Q 9/00* (2006.01)

(52) U.S. Cl.
CPC .............. *G01D 7/00* (2013.01); *B64D 43/00* (2013.01); *H04Q 9/00* (2013.01); *H04Q 2209/82* (2013.01)

(58) Field of Classification Search
CPC . G01D 7/00; B64D 43/00; H04Q 9/00; H04Q 2209/82
See application file for complete search history.

(56) References Cited

U.S. PATENT DOCUMENTS

| 6,668,640 B1* | 12/2003 | Alwin ................. G01K 13/028 73/170.02 |
| 7,808,413 B2 | 10/2010 | Griffith et al. |
| 9,796,479 B2 | 10/2017 | Tucker et al. |
| 2007/0130096 A1* | 6/2007 | Selvig ...................... G01P 5/14 706/45 |
| 2011/0106475 A1* | 5/2011 | Wigen .................. G01K 13/02 702/99 |
| 2017/0370960 A1* | 12/2017 | Benning ............. G01K 13/028 |

(Continued)

FOREIGN PATENT DOCUMENTS

EP  3581938 A1  12/2019
WO  9932963 A1  7/1999

OTHER PUBLICATIONS

Extended European search report issued in corresponding EP application No. 19215206.4, dated Jun. 29, 2020.

(Continued)

*Primary Examiner* — Amine Benlagsir
(74) *Attorney, Agent, or Firm* — Locke Lord LLP; Scott D. Wofsy; Alicia J. Carroll

(57) ABSTRACT

An air data system with a digital interface includes least one air data component, a receiving system and at least one digital connection. The at least one digital connection is between the receiving system and the air data component. A method for transmitting data in an air data system with a digital interface includes measuring at least one air data parameter with at least one air data component. The method includes generating a digital signal representative of the at least one air data parameter with the at least one air data component, sending the digital signal to a receiving system, and processing the at least one air data parameter with the receiving system.

15 Claims, 2 Drawing Sheets

(56) References Cited

U.S. PATENT DOCUMENTS

2019/0064198 A1    2/2019  Liffrig et al.
2019/0279443 A1*   9/2019  Bharadwaj ................ B64F 5/60
2019/0383847 A1   12/2019  Naslund et al.

OTHER PUBLICATIONS

Hagen F W et al.: "Deutsche Airbus flight test of Rosemount smart probe for distributed air data systems", IEEE Aerospace and Electronic Systems Magazine, IEEE Service Center, Piscataway, NJ, US, vol. 9, No. 4, Apr. 1994 (Apr. 1994), pp. 7-14, XP011422860.
European Communication Pursuant to Art 94(3) EPC, dated Apr. 12, 2022, issued during the prosecution of European Patent Application No. EP 19215206.4, 6 pages.
Summons to Attend Oral Proceedings Pursuant to Rule 115(1) EPC issued in corresponding EPO Application No. European Patent Application No. 19215206.4 dated Apr. 13, 2023, 8 pages.

* cited by examiner

DIGITAL AIR DATA SYSTEMS AND METHODS

BACKGROUND OF THE INVENTION

1. Field of the Invention

The present disclosure relates to air data systems, and more particularly to distributed air data systems.

2. Description of Related Art

Traditional air data system (ADS) architecture consists of multiple distributed components to measure a full set of air data parameters. These components measure parameters such as static pressure, Pitot pressure, air temperature, angle-of-attack and angle-of-sideslip. Each component measures each air data parameter individually but are often connected to separate air data modules via pneumatic tubing. In some systems, components are available where multiple air data parameters are measured and processed within a single probe, without a separate air data module.

Such conventional methods and systems have generally been considered satisfactory for their intended purpose. However, there is still a need in the art for improved air data system architectures that are easier to maintain and cost effective. The present disclosure provides a solution for this need.

SUMMARY

An air data system with a digital interface includes least one air data component, a receiving system and at least one digital connection. The at least one digital connection is between the receiving system and the air data component.

In accordance with an embodiment, each air data component includes an integrated receiving portion and transducer. The receiving system can be a centralized avionics computer. The at least one digital connection can be at least one of a wired digital connection between the receiving system and the air data component or a wireless digital connection between the receiving system and the air data component. The receiving system can be operatively connected to a display to output processed data thereto. The at least one air data component can be a plurality of air data components. Each of the plurality of air data components can be digitally connected to the receiving system with a respective digital connection. The plurality of air data components can include at least one of a Pitot probe, a static port, a total-air-temperature (TAT) probe, an angle-of-sideslip (AOS) sensor, or an angle-of-attack (AOA) sensor. The at least one air data component can include multiple sets of air data components. The receiving system can be one of a plurality of receiving systems. Each of the sets of air data components can be digitally connected to a respective one of the receiving systems. The at least one air data component can include a respective heating element. The heating element can be operatively connected to at least one of a transducer or the receiving system for at least one of status monitoring or control inputs.

In accordance with another aspect, a method for transmitting data in an air data system with a digital interface includes measuring at least one air data parameter with at least one air data component. The method includes generating a digital signal representative of the at least one air data parameter with the at least one air data component, sending the digital signal to a receiving system, and processing the at least one air data parameter with the receiving system.

Processing the at least one air data parameter can include generating at least one air data characteristic. In an embodiment, sending the digital signal to a receiving system includes sending the digital signal over at least one digital connection between the receiving system and the air data component. The at least one digital connection can be at least one of a wired digital connection between the receiving system and the air data component or a wireless digital connection between the receiving system and the air data component. Measuring the at least one air data parameter can include measuring the at least one air data parameter with an integrated receiving portion of the air data component. The method can include monitoring and/or controlling a respective heating element of the at least one air data component with at least one of a transducer or the receiving system. Measuring the at least one air data parameter can include measuring an air data parameter linked to prognostics for the at least one air data component. Processing the at least one air data parameter can include processing the air data parameter linked to prognostics to determine a health status for the at least one air data component.

Generating the digital signal can include generating the digital signal with a transducer of the air data component. The receiving system can be a centralized avionics computer. The method can include sending the at least one air data characteristic to a display. The at least one air data component can be a plurality of air data components. Each of the plurality of air data components can be digitally connected to the receiving system with a respective digital connection. The at least one air data component can be a plurality of air data components. The plurality of air data components can include at least one of a Pitot probe, a static port, a total-air-temperature (TAT) probe, an angle-of-sideslip (AOS) sensor, or an angle-of-attack (AOA) sensor. The at least one air data component can include multiple sets of air data components, wherein each of the sets of air data components is digitally connected to a respective receiving system.

These and other features of the systems and methods of the subject disclosure will become more readily apparent to those skilled in the art from the following detailed description of the embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE EMBODIMENTS

Figure 1:
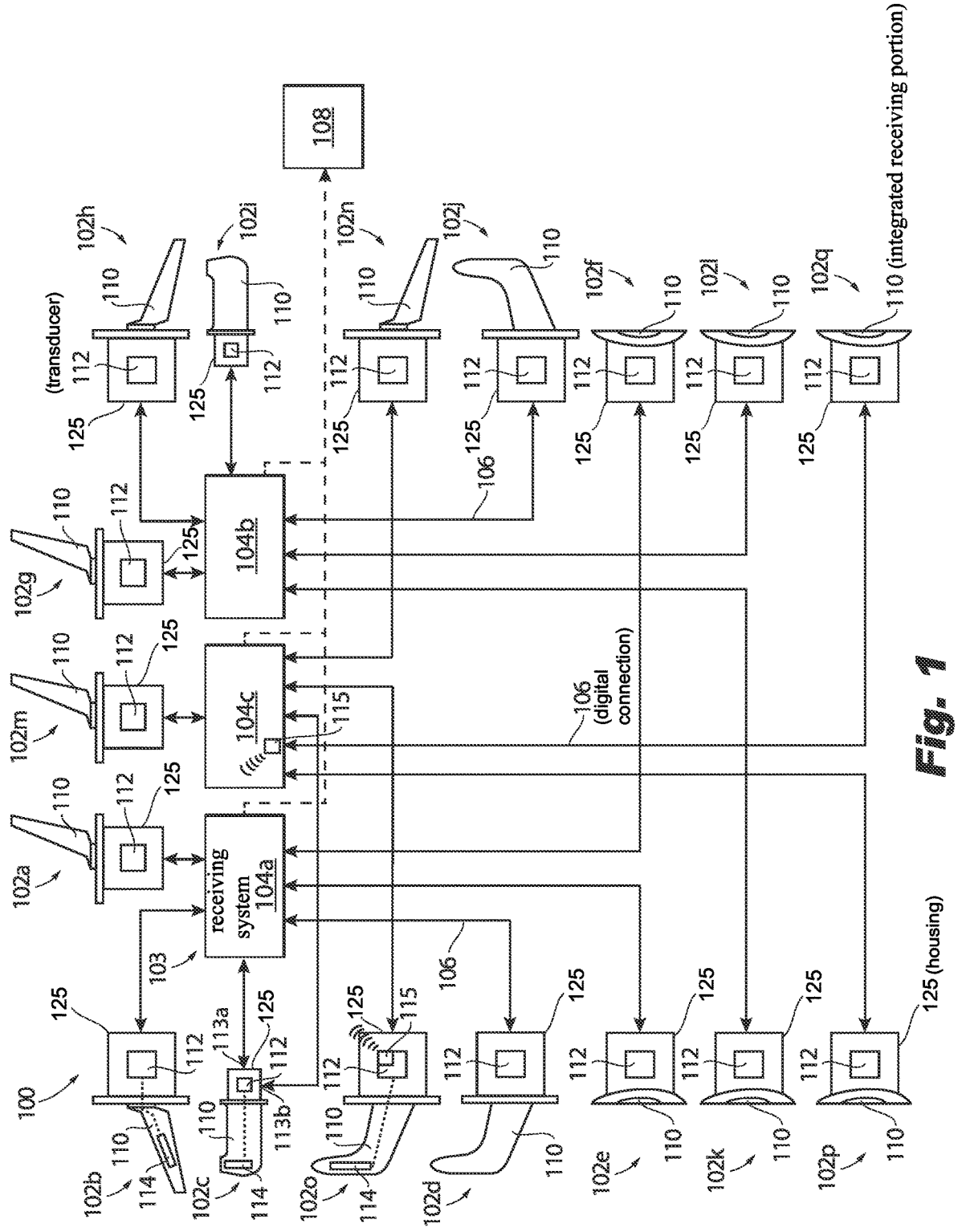
FIG. 1 is a schematic depiction of an air data system with a digital interface constructed in accordance with embodiments of the present disclosure, showing sets of air data components digitally connected to respective receiving systems.

Reference will now be made to the drawings wherein like reference numerals identify similar structural features or aspects of the subject disclosure. For purposes of explanation and illustration, and not limitation, a schematic depiction of an exemplary embodiment of an air data system the disclosure is shown in FIG. 1 and is designated generally by reference character 100. Other embodiments of air data systems in accordance with the disclosure, or aspects thereof, are provided in FIG. 2, as will be described. The systems and methods described herein can be used in air data systems, such as those for fixed-wing air vehicles, though the present disclosure is not limited to use on air vehicles.

As shown in FIG. 1, an air data system 100 with an all-digital interface 103 includes a plurality of air data components 102a-102q, a plurality of receiving systems 104a-104c and a plurality of digital connections 106. The receiving systems 104a-104c are centralized avionics systems. The plurality of air data components 102a-102q include at least one of a Pitot probe, a static port, a total-air-temperature (TAT) probe, an angle-of-sideslip (AOS) sensor, or an angle-of-attack (AOA) sensor. The digital connections 106 are between the receiving systems 104a-104c and their respective air data components 102a-102q. Digital connections 106 are configured to send data from one or more of the air data components 102a-102q to one or more of the receiving systems 104a-104c, and/or send data/commands from one or more of the receiving systems 104a-104c to one or more of the air data components 102a-102q. The air data components 102a-102q include multiple sets of air data components 102a-102q. Each set, for example, includes at least one of each type of component. Those skilled in the art will readily appreciate that air data components 102a-102q are positioned in a variety of locations throughout the aircraft, such as extending from a skin of the aircraft on a fuselage or wing, flush with the skin of the aircraft on a fuselage or wing, or extending from/flush with the skin of the aircraft in a variety of other suitable locations.

With continued reference to FIG. 1, a first set includes AOS sensor 102a, AOA sensor 102b, a first output 113a of TAT probe 102c, an integrated Pitot probe 102d, an integrated left-hand static port 102e, and an integrated right-hand static port 102f. A second set includes AOS 102g, AOA sensor 102h, TAT probe 102i, an integrated Pitot probe 102j, an integrated left-hand static port 102k, and an integrated right-hand static port 102l. A third set includes AOS 102m, AOA sensor 102n, a standby integrated Pitot probe 102o, a second output 113b of TAT probe 102c, a standby integrated left-hand static port 102p, and a standby integrated right-hand static port 102q. In the embodiment of FIG. 1, TAT probe 102c is a dual output TAT probe and provides data to receiving system 104a and receiving system 104c. In some embodiments, it is contemplated that the third set can have its own discrete TAT probe. The first set of air data components 102a-102f is digitally connected to a respective receiving system 104a, the second set of air data components 102g-102l is digitally connected to a second respective receiving system 104b and the third set of air data components 102m-102q is digitally connected to a third respective receiving system 104c. Each air data component 102a-102q includes an integrated receiving portion 110, e.g. a port or probe itself, and a housing 125 having a transducer 112.

With continued reference to FIG. 1, each transducer 112 is digitally connected to one or more receiving systems 104a-104c by way of a wired digital connection, or by way of wireless digital transmission. Each digital connection 106 is represented in FIG. 1 by a solid black double-headed arrow, not all of which are labeled for sake of simplicity. Each solid black double-headed arrow represents a wired digital connection and/or a wireless digital connection. While digital connection 106 is schematically shown as connecting to the air data components 102a-102q, generally, those skilled in the art will readily appreciate that the digital connections 106 can be directly connected to the transducers 112 or other internal connector within air data components 102a-102q. In embodiments where wireless digital transmission is used, one or more of transducers 112 or one or more air data components 102a-102q, generally, include a wireless transmitter/receiver 115. One or more of receiving systems 104-104c similarly include a wireless transmitter/receiver 115. The wireless transmitter/receivers 115 of the receiving systems 104a-104c are configured and adapted to send and/or receive signals to/from the wireless transmitters/receivers 115 of their associated given air data components 102a-102q. As an example, air data component 102o is shown with a wireless transmitter/receiver 115 in wireless communication with an associated wireless transmitter/receiver 115 of receiving system 104c. Receiving systems 104a-104c are operatively connected to a display 108 to output processed data thereto. Those skilled in the art will readily appreciate that display 108 can be positioned within a cockpit of an aircraft, or in another location. Display 108 can similarly be connected by wireless transmission, or can be connected by a wired digital connection.

As shown in FIG. 1, by having each air data component 102a-102q measure their own discrete parameter, each air data component 102a-102q is positioned in the optimal positional on an aircraft to obtain that parameter, providing measurement benefits over some digital systems that have a single probe with multiple parameters being measured at the same location by the same probe. In addition to measurement benefits, air data system 100 provides redundancy and increased reliability. Moreover, the all-digital interface via connections 106 provides the benefit of mitigating measurement error found in traditional systems that include long wires with sensitive signals (e.g. TAT, AOA or the like) that require complicated small signal measurement. Additionally, digital connections 106 provide easier maintenance than some traditional connectors.

As shown in FIG. 1, AOA sensor 102b, TAT probe 102c, and standby integrated Pitot probe 102o include respective heating elements 114. Each heating element 114 is operatively connected to a respective transducer 112. Each heating element 114 is operatively connected to a respective one of receiving systems 104a, 104b, and 104c by way of digital connection 106. Those skilled in the art will readily appreciate that heating elements 114 are used for a variety of reasons, e.g. de-icing and/or anti-icing of the air data components. In the embodiment of FIG. 1, each transducer 112 monitors and/or controls its respective heating element 114. It is contemplated that receiving systems 104a, 104b, and/or 104c may provide input to their associated transducers 112 and/or heating elements 114 as a part of the heater control methodology. This provides integrated heater control and/or monitoring. Heating elements 114 are shown in a few of the air data components for sake of simplicity, but it is contemplated that each of the air data components 102a-102q could include a respective heating element operatively connected to the same receiving system that their respective air data components are connected to.

Figure 2:
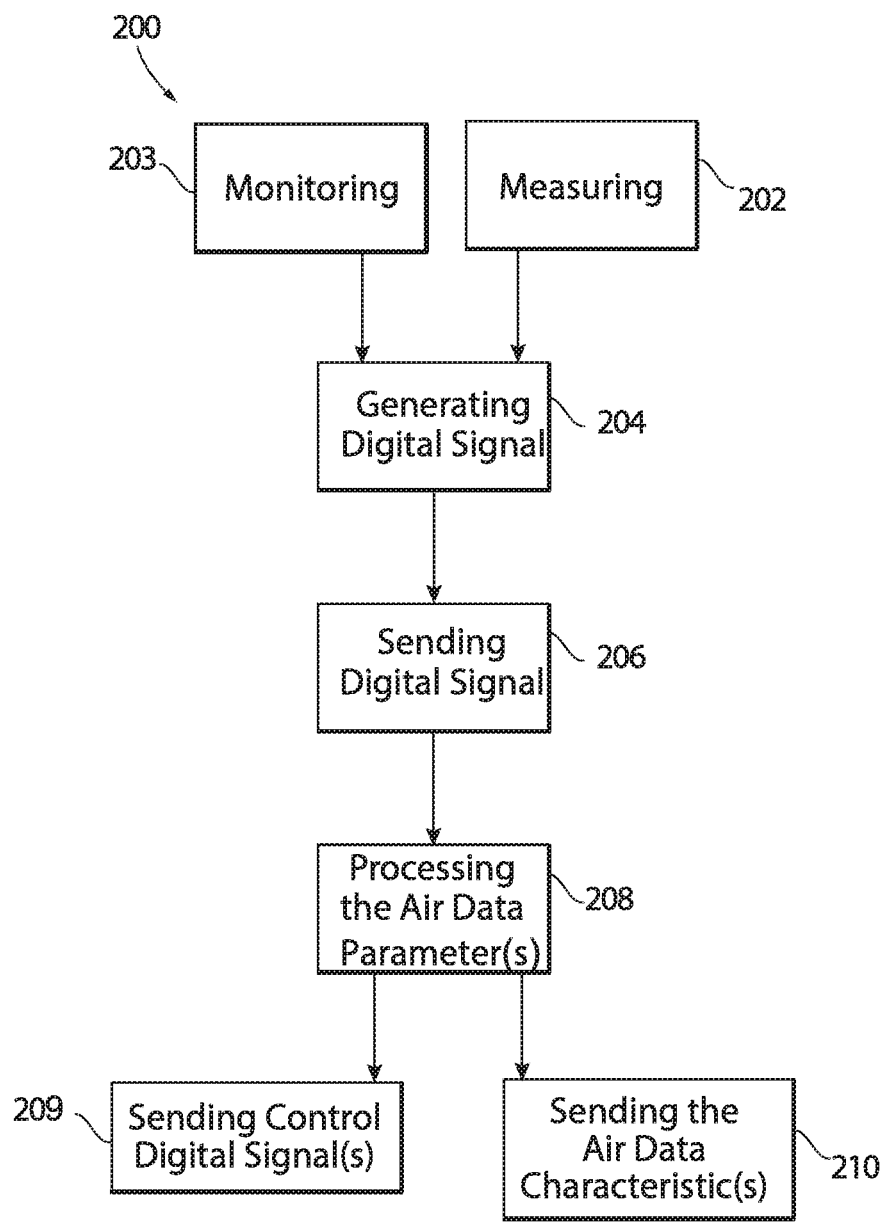
FIG. 2 is a schematic depiction of a method for transmitting data in an air data system with a digital interface in accordance with embodiments of the present disclosure.

With reference now to FIG. 2, a method 200 for transmitting data in an air data system, e.g. the air data system 100, with a digital interface, e.g. digital interface 103, includes measuring at least one air data parameter with at least one air data component, e.g. air data components 102a-102q, as indicated schematically by box 202. In some embodiments, at least one air data component is plurality of air data components, similar to air data components 102a-102q described above. Measuring the at least one air data parameter includes measuring the at least one air data parameter with an integrated receiving portion, e.g. integrated receiving portion 110, of the air data component. In some embodiments, measuring the at least one air data parameter includes measuring an air data parameter linked to prognostics for the at least one air data component.

With continued reference to FIG. 2, the method 200 includes generating a digital signal representative of the at least one air data parameter with the air data component, as indicated schematically by box 204. Generating the digital signal includes generating the digital signal with a transducer, e.g. transducer 112, of the air data component. The method 200 includes sending the digital signal to a receiving system, e.g. one or more of receiving systems 104a-104b, as indicated schematically by box 206. Sending the digital signal to the receiving system includes sending the digital signal over at least one digital connection, e.g. digital connection 106, between the receiving system and the air data component. The at least one digital connection can be at least one of a wired digital connection between the receiving system and the air data component or a wireless digital connection between the receiving system and the air data component, similar to the wired/wireless connections described above in the context of FIG. 1. The method 200 includes processing the at least one air data parameter with the receiving system, as indicated schematically by box 208. In some embodiments, processing the at least one air data parameter includes processing the at least one air data parameter to generate at least one air data characteristic. Processing the at least one air data parameter includes processing the air data parameter linked to prognostics to determine a health status for the at least one air data component. The method 200 includes sending the at least one air data characteristic to a display, e.g. display 108, as indicated schematically by box 210.

The method 200 includes monitoring and/or controlling one or more heating elements, e.g. heating element 114, of the air data components with the transducer and/or one or more of receiving systems, as indicated schematically by box 203. Monitoring includes generating a digital signal representative of a status of one of the respective heating elements, as indicated schematically by box 204. Each digital signal can be generated separate from, or along with, the digital signal representative of the at least one air data parameter. For a given heating element, the method 200 includes sending and processing the digital signal in a manner similar to that described above with respect to air data components. The method 200 also includes controlling each heating element with the transducer and/or by sending one or more control digital signals from the receiving system to the transducer of the given air data probe having the heating element being controlled, as indicated schematically by box 209. The control digital signals can include input as a part of the heater control methodology, ON/OFF signals, specific temperature commands for the heating elements, or the like.

The methods and systems of the present disclosure, as described above and shown in the drawings provide for air data systems with superior properties including increased reliability. While the apparatus and methods of the subject disclosure have been shown and described with reference to certain embodiments, those skilled in the art will readily appreciate that change and/or modifications may be made thereto without departing from the scope of the subject disclosure.

What is claimed is:

1. An air data system with a digital interface, the system comprising:
   a plurality of sets of air data components, wherein each set of the plurality of sets of air data components includes an angle-of-sideslip (AOS) sensor, an angle-of-attack (AOA) sensor, a total-air-temperature (TAT) probe, an integrated Pitot probe, an integrated left-hand static port and an integrated right-hand static port, wherein said each set of the plurality of sets of air data components includes an integrated receiving portion and transducer;
   a plurality of receiving systems external of the plurality of sets of air data components; and
   respective digital connections between each receiving system of the plurality of receiving systems and said each set of the plurality of sets of air data components, wherein said each receiving system is configured and adapted to process at least one air data parameter from said each set of the plurality of sets of air data components to generate at least one air data characteristic.

2. The air data system as recited in claim 1, wherein at least one of the respective digital connections is at least one of a wired digital connection between at least one of the plurality of receiving systems and at least one set of the plurality of sets of air data components or a wireless digital connection between said at least one of the plurality of receiving systems and said at least one set of the plurality of sets of air data components.

3. The air data system as recited in claim 1, wherein said each set of the plurality of the sets of air data components is digitally connected to a respective one of the plurality of receiving systems.

4. The air data system as recited in claim 1, wherein said each set of the plurality of sets of air data components includes a respective heating element, wherein the respective heating element is operatively connected to at least one of the transducer or one of the plurality of receiving systems for at least one of status monitoring or control inputs.

5. A method for transmitting data in an air data system with a digital interface, the method comprising:
   measuring at least one air data parameter with a plurality of sets of air data components, wherein each set of the plurality of sets of air data components includes an angle-of-sideslip (AOS) sensor, an angle-of-attack (AOA) sensor, a total-air-temperature (TAT) probe, an integrated Pitot probe, an integrated left-hand static port and an integrated right-hand static port, wherein said each set of the plurality of sets of air data components includes an integrated receiving portion and transducer;
   generating a digital signal representative of the at least one air data parameter from said each set of the plurality of sets of air data components;
   sending the digital signal to at least one of a plurality of receiving systems external to the plurality of sets of air data components; and
   processing the at least one air data parameter with the at least one of the plurality of receiving systems.

6. The method of claim 5, wherein processing the at least one air data parameter includes generating at least one air data characteristic.

7. The method of claim 5, wherein sending the digital signal to the at least one of the plurality of receiving systems includes sending the digital signal over at least one digital connection between the at least one of the plurality of receiving systems and at least one set of the plurality sets of air data components.

8. The method of claim 7, wherein the at least one digital connection is at least one of a wired digital connection between the at least one of the plurality of receiving systems and the at least one set of the plurality of sets of air data components or a wireless digital connection between the at least one of the plurality of receiving systems and the at least one set of the plurality of sets of air data components.

9. The method of claim 5, wherein measuring the at least one air data parameter includes measuring the at least one air data parameter with the integrated receiving portion of at least one set of the plurality of sets of air data components.

10. The method of claim 5, further comprising at least one of monitoring or controlling a respective heating element of at least one set of the plurality of sets of air data components with at least one of the transducer or the at least one of the plurality of receiving systems.

11. The method of claim 5, wherein measuring the at least one air data parameter includes measuring the at least one air data parameter linked to prognostics for at least one set of the plurality of sets of air data components.

12. The method of claim 11, wherein processing the at least one air data parameter includes processing the at least one air data parameter linked to prognostics to determine a health status for the at least one set of the plurality of sets of air data components.

13. The method of claim 5, wherein generating the digital signal includes generating the digital signal with the transducer of at least one set of the plurality of sets of air data components.

14. The method of claim 5, wherein said each set of the plurality of sets of air data components is digitally connected to the at least one of the plurality of receiving systems with a respective digital connection.

15. The method of claim 5, wherein said each set of the plurality of sets of air data components is digitally connected to the at least one of the plurality of receiving systems.

* * * * *